United States Patent [19]

Ciuba et al.

[11] Patent Number: 4,495,225

[45] Date of Patent: Jan. 22, 1985

[54] METHOD AND COMPOSITION FOR THE PREVENTION OR INHIBITION OF CORROSION

[75] Inventors: Stanley J. Ciuba, Burnsville; Michael J. Bartelme, III, Richfield, both of Minn.

[73] Assignee: Economics Laboratory, Inc., St. Paul, Minn.

[21] Appl. No.: 591,676

[22] Filed: Mar. 21, 1984

[51] Int. Cl.$^3$ .................... B05D 3/02; C09K 3/00; C04B 9/02

[52] U.S. Cl. .................... 427/236; 427/385.5; 427/388.1; 427/388.5; 427/239; 252/395; 106/14.23; 106/14.25; 106/14.29; 106/14.38

[58] Field of Search ............... 106/14.23, 14.25, 14.27, 106/14.28, 14.29, 14.38; 252/395, 389.1, 389.52, 389.53; 427/236, 239, 385.5, 388.1, 388.5, 435, 443, 434.3; 148/6.24

[56] References Cited

U.S. PATENT DOCUMENTS

| | | |
|---|---|---|
| 441,291 | 11/1890 | Dejonge . |
| 1,630,101 | 5/1927 | Wilkin . |
| 2,128,523 | 8/1938 | Burwell .................... 134/1 |
| 2,242,837 | 5/1941 | Shields .................... 260/29 |
| 2,348,715 | 5/1944 | Adams .................... 106/14 |
| 2,421,672 | 6/1947 | Wilson et al. .................... 106/14 |
| 2,453,833 | 11/0000 | Davis et al. .................... 260/23 |
| 2,796,353 | 6/1957 | Dieman et al. .................... 106/14 |
| 3,033,808 | 5/1982 | Murray et al. .................... 260/23 |
| 3,035,926 | 5/1962 | Larrieau .................... 106/14 |
| 3,035,926 | 5/1962 | Larrieau .................... 106/14 |
| 3,137,583 | 6/1964 | Bryan et al. .................... 106/14 |
| 3,260,609 | 7/1966 | Reeser .................... 106/263 |
| 3,453,124 | 7/1969 | Wurstner .................... 106/14.26 |
| 3,565,843 | 2/1971 | Kassinger et al. .................... 260/28.5 |
| 3,661,622 | 5/1972 | Rogers .................... 117/75 |
| 3,925,087 | 12/1975 | Lechner et al. .................... 106/14.25 |
| 4,150,192 | 4/1979 | Downey .................... 428/462 |

FOREIGN PATENT DOCUMENTS

P 2330375  6/1972  Fed. Rep. of Germany .

Primary Examiner—Norman Morgenstern
Assistant Examiner—Ken Jaconetty
Attorney, Agent, or Firm—Merchant, Gould, Smith, Edell, Welter & Schmidt

[57] ABSTRACT

A method and composition for preventing corrosion is disclosed. The method involves forming a coating of from about 2 to 5 mils thick on a surface, with a composition comprising an over-based alkaline earth organic sulfonate salt, a drying oil, a copper or rare earth metal drier, a zinc metal drier, a naphthenic or straight chain paraffinic oil, and petrolatum, and curing the coating. Preferably, the composition will include a copper metal drier, a zinc metal drier, and a rare earth metal drier. The method and composition are particularly useful for metal surfaces which contact sea water.

30 Claims, No Drawings

METHOD AND COMPOSITION FOR THE PREVENTION OR INHIBITION OF CORROSION

TECHNICAL FIELD

This invention relates to a method and composition for coating metal surfaces such as carbon steel surfaces to protect them from the formation of rust or other corrosion. The composition of the present invention includes an overbased calcium sulfonate, a drying oil, a naphthenic or straight chain paraffinic oil, petrolatum, polyisobutylene, and two, or preferably three, metal driers. When applied to a metal surface, the composition of the invention will provide a coating of up to 15 mils in thickness. The coating provides very good adhesion to metal, exceptional coating thickness, and long term stability and corrosion protection in sea water.

BACKGROUND OF THE INVENTION

Corrosion of metals can be a significant problem where metal surfaces are exposed to water, air, inorganic metal salts, and the like. One very significant source of corrosion is seawater, which can attack and corrode ferrous and non-ferrous metals. A variety of equipment is subject to corrosion by seawater, including piping, dry-docks, and surfaces of ships and barges, particularly the inner surfaces of ballast tanks.

Many corrosion preventive compositions are known. One of the more common approaches to the prevention or inhibition of corrosion is to coat the metal surface with an organic material, thereby placing a barrier between the metal surface and the environment. Frequently, a substantially permanent coating such as a cured resin is utilized. However, in many situations a cured resin coating is impractical. For example, as previously noted, a common site of corrosion problems is the interior of ship ballast tanks. Generally, maintenance or repair work is performed inside these tanks at least once a year. Typically, any coating must be stripped off the inner surfaces of the tank to facilitate the work therein. Many of the cured resin coatings and other rust preventives commonly used for other purposes are inappropriate for use in a ballast tank because such coatings typically require caustic or toxic removers or strippers for their removal. Use of these toxic substances inside the tanks where work must be performed is highly undesirable. Preferably, protective coatings utilized on the interior surfaces of ballast tanks should be removable with a solvent of low volatility and toxicity, to prevent injury to those who must remove the coating or perform maintenance or repair of the tank.

A corrosion or rust preventive coating for ballast tanks which can be removed by solvents of low toxicity is disclosed in U.S. Pat. No. 3,925,087, issued Dec. 9, 1975 to Lechner et al. However, the composition disclosed in U.S. Pat. No. 3,925,087 will generally provide a coating of no greater than 3 mils, or more typically, 1 to 2 mils. When applied in a thicker layer, this and other similar coatings generally fail to properly cure, and to the extent they do cure, require an inconveniently long period of time to do so. Further, thicker coatings of compositions such as that disclosed in U.S. Pat. No. 3,925,087 tend to flow, and in fact a coating thickness of greater than about 3 or 4 mils generally cannot be maintained.

The thinner coatings, such as those from 1 to 3 mils, tend to provide limited protection from corrosion because a thinner coating of known rust preventive coating materials will tend to wear away faster than a thicker coating of an equally effective substance.

Accordingly, a need exists for a corrosion or rust preventive coating composition which will maintain a coating thickness of greater than 3 mils, which is relatively safe and can be relatively easily and safely removed from a surface when desired, and which exhibits exceptionally effective and long lasting corrosion prevention even where applied in a thickness of less than 3 mils.

BRIEF DESCRIPTION OF THE INVENTION

We have discovered a rust preventive composition which when applied to a metal surface such as a carbon steel interior surface of a ballast tank can maintain a coating thickness of up to 15 mils, but is also exceptionally effective at lower coating thicknesses such as 2–4 mils. The composition exhibits exceptional and long lasting corrosion resistance, and has low volatility, low toxicity, and a high flash point. The coating is removable with a solvent of low toxicity, but will generally withstand hot water or turbulation.

The present invention is a method and composition for coating ferrous or non-ferrous metal surfaces to protect them from corrosion. The composition of the present invention includes about 10 to 80 percent by weight of a rust-inhibitive, grease-like concentrate. The concentrate comprises a thixotropic inorganic/organic complex stably disposed in an essentially inert liquid or oily phase, in an amount not to exceed 4 parts, per part of the complex, of the essentially inert liquid oily phase. The inorganic/organic complex comprises an overbased alkaline earth organic sulfonate salt. The crystalline structure of the inorganic portion of the complex is platelet and film-forming in character.

The composition further includes about 5 to 25 percent by weight of a drying oil. The drying oil is characterized in that it is miscible in a diluent oil selected from the group consisting of aliphatic hydrocarbon diluents, cycloaliphatic hydrocarbon diluents, aromatic hydrocarbon diluents and mixtures thereof, boiling at temperatures above 150° C.

The invention further comprises about 0.03 to 0.6 percent by weight metal of a first metal drier selected from the group consisting of copper carboxylate compounds and rare earth carboxylate compounds, and mixtures thereof. A second metal drier is also provided, at about 0.11 to 2.2 percent by weight metal to the weight of the total composition. The second metal drier consists of zinc carboxylate compounds. Preferably, the composition will include a copper carboxylate compound, a zinc carboxylate compound, and as a third metal drier, a rare earth carboxylate compound.

In addition, the composition comprises about 20 to 60 percent by weight of naphthenic or straight chain paraffinic oils or mixtures thereof, and about 2 to 15 percent by weight petrolatum.

In the method of this invention, a coating of from about 2 to 15 mils thick of the above-described composition is formed on a surface requiring protection from corrosion. After formation of the coating, the coating is cured to provide the desired corrosion-preventive characteristics.

Rather than curing to a hard, brittle state, the coating formed of the composition of this invention tends to cure to a solid but soft protective layer. The coating can penetrate a porous surface, or spread under existing corrosion, and has little or no tendency to crack, flake, or peel.

DETAILED DESCRIPTION OF THE INVENTION

A major component of the composition of the present invention is the inorganic-organic complex. The preferred complexes can be characterized as over-neutralized salts of organic sulphonic acids. These over-neutralized or "overbased" salts can be characterized by the following structural formula:

$$(RSO_3)_m M.aM_x X_m$$

wherein
R represents an alkyl-aryl group, e.g. $C_{18-36}H_{37-73}$PH—(wherein—PH—represents phenylene);
M represents a metal of valence m;
m represents the valence of M and is preferably an integer ranging from 1 to 4, more typically 1 or 2;
X represents a basic anion having a valence of x;
x represents the valence of X and typically an integer ranging from 1 to 3; and
a represents the excess over stoichiometry, in equivalents, for the basic salt $M_x X_m$.

Accordingly, a is greater than 0 and preferably greater than 1. As is shown by U.S. Pat. No. 3,453,124 (Wurstner) values for a of 3 or 4 are not unusual and values of about 8 or more are permissible.

The inorganic-organic complexes are available in grease-like concentrates wherein the inorganic-organic complex has been stably dispersed in an inert oily diluent. The amount of inorganic-organic complex in these concentrates is said to amount to at least 25% by weight and more typically 50–70% by weight. Accordingly, the amount of oily diluent is typically about 60 parts per 100 by weight, based on the weight of the complex. However, since the order of addition of ingredients making up a composition of this invention is not critical, dilution of the inorganic-organic complex/dispersant component to levels approaching actual use levels of this invention (e.g. about 10–25% by weight of the complex per se dispersed in oil) can be carried out prior to the addition of the drying oil. Thus, a diluted concentrate containing, for example, 70% hydrocarbon oil can be used without substantial modification in this invention.

The preferred rust-preventive concentrate consists essentially of a grease-like dispersion of the inorganic-organic complex in oil and has the following physical and chemical properties:

Specific gravity at 60° F.: 1.006 g/c.c.
Brookfield viscosity (No. 6 spindle at 10 rpm, 77° F.): 110,000–150,000 centipoise.
Flash point, PMCC ASTM Test D-93: 375° F.
Melting point: 550° F.
"Non-volatiles" (Federal Standard 141A Method 4041.1): 96 wt.%, minimum.
Sulfated ash, ASTM Test D-874: 24.5%

This product, commercially designated as SACI 200 A (trademark) is very polar and thixotropic. It is available from Witco Chemical Corporation, New York. It is compatible with aromatic, aliphatic, or chlorinated hydrocarbons commonly used as diluents. The amount of inorganic-organic complex dispersed in the oil is believed to be about 40% by weight, and the complex is believed to be the calcium sulfonate/calcium carbonate type having the formula $(RSO_3)_2 Ca.aCaCo_3$, wherein R and a have the significance indicated previously. Although the SACI 200 A product is recommended for use in interior protective coatings only, it is preferred for outdoor use in the context of this invention. The related outdoor product, designated SACI 300, is less preferred in this invention, due to its lower flash point.

In the preferred embodiments of this invention, the amount of concentrate is ordinarily at least about 10% by weight and generally not more than about 80% by weight. Preferably, for improved corrosion resistance, adhesion, and coating thickness the concentrate is present in the composition at a concentration of about 30–40% by weight.

The SACI 200 A product appears to be among the most effective concentrates which can be used in the context of this invention. While not wishing to be limited to any theory, we theorize that the particular crystal structure of the calcium carbonate contained therein contributes to the beneficial results obtained where SACI 200 A product is used in the method and composition of this invention.

Drying Oils

A drying oil or oils will comprise about 5–25% by weight of the total composition of this invention. A main characteristic of drying oils is a high content of unsaturated fatty acids. The preferred drying oil in the context of this invention is tung oil, also known as eleosteric acid. Tung oil is preferred for reasons of effectiveness in providing corrosion-resistance of the total composition. Another highly suitable drying oil for the purposes of this invention is oiticica oil. Adequate results have also been obtained with other drying oils such as linseed oil. Other suitable drying oils will no doubt occur to those skilled in the art.

We have discovered that a concentration of approximately 10–20% by weight tung oil, in combination with the various other components of this invention, generally provides the most desirable viscosity, curing, and corrosion resistance.

Diluent Oil

A hydrocarbon diluent oil is utilized in this invention at a concentration of about 20–60% or preferably, about 30–45% by weight of the total composition. The oil is used primarily as a carrier, to dissolve the other components of the composition. The naphthenic and straight chain paraffinic oils, particularly the naphthenic oils, are preferred, due to their effectiveness in the context of this invention. The aromatic oils are generally not suitable, possibly because they tend to be less highly saturated than the other oils.

We have found that an oil or oil mixture having an average viscosity of about 70–130 Saybolt Universal seconds, or preferably, 90–110, or most preferably, about 100, provides a rust preventive coating of highly desirable viscosity, coating thickness, curing, and corrosion resistance, in the context of this invention. Oils having an average viscosity outside the range of 70–130 may be used, but generally the viscosity of the resulting product will result in a less desirable coating thickness.

Suitable carrier oils for the purposes of this invention are the TUFFLO ® process oils (naphthenic), available from Arco Petroleum Products Co. of Hinsdale, Illinois. The TUFFLO ® process oil grade 105 is particularly suitable. The TUFFLO ® process oil grade 105 has an average viscosity of about 108 Saybolt Universal seconds at 100° F., a specific gravity 60/60 of about 0.900, a sulphur content of about 0.04%, a refractive index at 20° C. of about 1.4985, an average molecular weight of about 300, a volatility, at 22 hours/225° F. of about 11, an aromatic content of about 36.5% and a saturates content of about 62.9%.

An oil similar to the Tufflo ® 105 grade process oil which is also useful in the context of this invention is the Coray 40 TM oil available from Exxon.

If desired, various grades of naphthenic or straight chain paraffinic oils can be mixed together to provide an oil mixture having the desired average viscosity. For example, the Tufflo ® 55 grade process oil can be mixed with the Tufflo ® 300 grade process oil in appropriate amounts to yield an oil mixture having an average viscosity of about 100.

Oxidized Petrolatum

The composition of the invention further comprises about 2–15%, or preferably, about 3–8%, petrolatum or oxidized petrolatum. It is believed that the petrolatum enhances the uniformity of the filming or coating formation, and prevents streaking of the coating.

A preferred petrolatum composition is the Alox 600 product available from the Alox Corporation. This product is a mixture of relatively high molecular weight organic acids, lactones and esters derived from petroleum. Chemical and physical properties of this product include a typical acid number (ASTM-D-9-74) of from about 45–60, a saponification number (ASTM-D-94) of about 100–140, a specific gravity at 75° F. (24° C.) of about 0.95, an average weight per gallon at 75° F. of about 7.9 lbs., a minimum melting point of about 115° F. (46° C.), a minimum flash point of about 345° F. (174° C.) and a maximum ash content (ASTM D-48-2) of about 0.2%. It is believed that other similar relatively high molecular weight materials having some organic acid functionality would also be suitable for the purposes of this invention.

If desired, polyisobutylene may be used in the context of this invention, to provide better adhesion to metal surfaces. We also believe that the polyisobutylene provides internal adhesion, which aids in maintaining a relatively thick coating. This component can be provided in a concentration of up to about 5% by weight of the total coating composition. We have found that for coating compositions to be applied or cured at higher temperatures, for example, in the warmer climates, it is advisable to reduce or eliminate the polyisobutylene to obtain the desired curing.

Polyisobutylene can be obtained from many chemical suppliers such as Amoco Chemical Corporation or Chevron Chemical Corporation. A suitable polyisobutylene composition will generally have a specific gravity at 60° F. of about 0.817–0.880 grams/cc, and a minimum flash point of about 365° F.

Metal Driers

The composition of this invention will include two, or preferably, for reasons of improved curing and corrosion resistance, three metal driers.

Where two metal driers are used, the first will be selected from the group consisting of copper carboxylate compounds and rare earth carboxylate compounds, and mixtures thereof. For reasons of better curing and improved corrosion resistance, copper carboxylate compounds are preferred.

If a copper metal drier is used, preferably it should be provided such that the copper metal content of the rust preventive coating coating composition is about 0.06 to 0.6 percent by weight. Most preferably, the copper metal content of the coating composition will be about 0.1 to 0.6 percent by weight.

A preferred copper metal drier is the CEM-ALL ® drier available from Mooney Chemicals, Inc. of Cleveland, Ohio. The CEM-ALL ® copper metal drier includes copper carboxylates produced from a blend of synthetic domestic acids. One of the CEM-ALL ® driers contains a concentration of about 12% by weight copper. Generally, the CEM-ALL ® copper carboxylates comprise neodecanoates and/or 2 ethyl hexoates. Typical characteristics of the 12% copper carboxylate CEM-All ® drier is a volatility of about 30%, a Gardner viscosity at 25° C. of J, a specific gravity at 25/25° C. of about 1.025, and a density of about 8.54 pounds per gallon.

Where the 12% copper CEM-ALL ® compound is used, the compound should comprise about 0.5 to 5.0 percent by weight of the rust preventive coating composition. Most preferably, it should comprise about 1.0 to 5.0 percent by weight of the composition.

A preferred rare earth metal drier is the 6% rare earth TEN-CEM ® drier available from Mooney Chemicals, Inc., a carboxylate produced from domestic neodecanoate acid. This drier generally comprises lanthanum and cerium carboxylate compounds. Typical characteristics of this drier include a volatility of about 70%, a Gardner viscosity, at 25° C., of A-5, a specific gravity at 25/25° C. of about 0.880, and a density of about 7.33 pounds per gallon.

Another preferred rare earth metal drier is the 12% rare earth HEX-CEM drier available from Mooney Chemicals, Inc. The HEX-CEM drier is an octoate, produced from 2-ethylhexoic acid. Typical characteristics of this drier include a volatility of about 41%, a Gardner viscosity, at 25° C., of A, a specific gravity at 25/25° C. of about 0.989, and a density of about 8.24 pounds per gallon.

If a rare earth drier is used as the first metal drier, the rare earth metal content of the rust preventive coating composition will preferably be about 0.03 to 0.6 percent by weight, or most preferably, about 0.03 to 0.3 percent by weight. To achieve this, for example the 6% rare earth TEN-CEM ® compound should be provided to comprise about 0.5 to 10.0, or more preferably, 0.5 to 5.0 weight-percent of the rust preventive coating composition.

Lead driers can also be suitable in place of the copper or the rare earth driers, but because of lead's toxicity, lead driers are far less desirable. It is also envisioned that a manganese carboxylate drier may be suitable as the first metal drier. If used, the manganese carboxylate drier should be provided in an amount such that the manganese metal content of the rust preventive coating composition is about 0.06 to 0.6 percent by weight.

The second metal drier is selected from the group consisting of zinc carboxylate compounds.

An example of preferred zinc driers is the zinc HEX-CEM ® driers available from Mooney Chemicals, Inc. The HEX-CEM ® zinc driers are produced from 2-ethylhexoic acid, a synthetic organic acid. The driers are characterized as octoates. The 22% zinc HEX-CEM drier has a zinc content of about 22% by weight, an NVM (non-volatile material) value of about 99%, and a volatility of about 1%. It has a Gardner viscosity at 25° C. of Y, a specific gravity at 25/25° C. of about 1.181, and a density of about 9.84 pounds per gallon.

Other suitable zinc driers include the zinc CEM-ALL ® driers from Mooney Chemicals. These driers are produced from a blend of synthetic domestic acids. The 8% zinc CEM-ALL ® drier typically has an NVM value of about 37%, a volatility of about 63%, a Gardner viscosity at 25° C. of A-5, a specific gravity (25/25° C.) of about 0.886, and lbs./gal. of about 7.38. The 16% zinc CEM-ALL ® drier typically has an NVM value of about 73%, a volatility of about 27%, a Gardner viscosity at 25° C. of A-1, a specific gravity (25/25° C.) of about 1.040, and lbs./gal. of about 8.66.

The NAP-ALL ® zinc driers, also available through Mooney Chemicals, are also suitable for use in this invention. These driers are produced from highly refined naphthenic acid and comprise naphthenates. Those currently available include an 8% zinc drier and a 10% zinc drier.

The zinc metal drier shuld be provided in an amount sufficient to provide a zinc metal content of about 0.1 to 2.2 percent by weight of the total coating composition. Preferably, for reasons of improved curing and coating thickness, the zinc metal drier will be provided in an amount sufficient to provide a zinc content of about 0.2 to 1.1 percent by weight of the total composition. Thus, for example, where the 22% zinc HEX-CEM ® drier is used, it should comprise about 0.5 to 10 percent, or preferably, about 1.0 to 5.0 percent by weight of the total coating composition.

The preferred coating composition of this invention comprises a copper metal drier, a zinc metal drier, and for enhanced curing and metal adhesion,, a third metal drier. The third metal drier comprises a rare earth carboxylate compound. The rare earth metals of this compound should comprise about 0.06 to 0.3 percent by weight of the coating composition of this invention.

Suitable rare earth carboxylate compounds include the rare earth HEX CEM ® driers and the rare earth TEN-CEM ® driers, both described previously. Other suitable rare earth carboxylate compounds can of course be used. Where the 6% rare earth TEN-CEM ® drier is used, to provide the desired metal content, it should comprise from about 1.0 to 5.0 percent by weight of the total coating composition.

Polyisobutylene

Polyisobutylene is provided in a concentration of about 0–5% by weight of the total composition, or preferably, about 0.5–3% by weight. While polyisobutylene is not required in the context of this invention, it is believed to provide adhesion such that the composition will cling to the metal surface. It is also believed to provide internal adhesion, which aids in maintaining a relatively thick coating.

Other Components

The coating composition of this invention may also comprise additional components such as viscosity modifiers, pigments, or other components as may be desirable.

We have found that aluminum pigments are suitable for use in this invention, although it is envisioned that other pigments such as carbon black may of course be used. A preferred aluminum pigment is the Lansford-243 aluminum paste available through Silberline Manufacturing Co., Inc. of Lansford, Pennsylvania. Typical characteristics of this pigment include a flake size of 99% minimum through 325 mesh (wet method screen analysis), a non-volatile content of about 65% minimum by weight and 35.3% minimum by volume, and a specific gravity of about 1.48. It is provided in a solvent comprising a mixture of mineral spirits and high aromatic compounds. Another suitable pigment is the Silberline Eternabrite 651-1, having a flake size of 99.9% through 325 mesh, a non-volatile content of 72% minimum by weight and 40.5% by volume, and a specific gravity of 1.60. The aluminum pigments can be provided in a concentration of about 0.5 to 1.0 percent by weight of the total coating composition.

For long term storage, it is recommended that the composition include an agent to prevent skinning. Generally, a methyl ethyl ketoxime composition such as "SKINO" TM available from Mooney can be added in an amount of about 0.7 to 2.0 percent by weight of the total coating composition to effectively prevent skinning during storage.

It may also be desirable to include known dispersants or suspension aids where long term storage is anticipated.

It is our present belief that the particular combination of a copper or rare earth carboxylate compound in combination with a zinc carboxylate compound, further in combination with the over-based sulfonate and additional components of this invention, provides the exceptional corrosion resistance exhibited by this invention. We have also found that the combination of three metal driers, namely, a copper carboxylate compound, a zinc carboxylate compound, and a rare earth carboxylate compound, in the context of this invention, will provide exceptional and surprisingly effective corrosion prevention.

Preparation of the Composition

As previously described, a preferred corrosion-inhibiting composition of this invention consists essentially of about 30–40% over-based calcium sulphonate, about 10–20% tung oil, about 30–45% naphthenic oil, about 3–8% petroleum, about 0.1 to 0.6% of copper in the form of copper carboxylate compounds, about 0.2 to 1.1% of zinc in the form of zinc carboxylate compounds, about 0.06 to 0.3% of rare earth metals in the form of rare earth carboxylate compounds, and about 0.5–5% polyisobutylene.

To prepare the coating composition of this invention, the oxidized petrolatum may be heated to its melting point, about 130° F. for ease of addition. The petrolatum may be melted in any suitable container such as a beaker, a drum, or the like. Heating elements may be used, or the container may be placed in a hot room. Other methods of heating can of course be used.

The diluent oil may be heated in an appropriate container on a hot plate, to about 120° to 150° F., in order to maintain a reasonable viscosity for the mixture to be formed. Preferably, the temperature will reach approximately 135° to 140° F. It is desirable that the temperature reach no higher than 150° F., to avoid reactions of the components.

To the heating diluent oil, with constant mixing, is added the calcium overbased sulfonate, followed by the melted or pre-heated oxidized petrolatum. These components should be thoroughly mixed, usually for about 10 minutes, for example with a motor driven propeller mixer.

The mixture is then allowed to cool to between 70° to 80° F. If desired, a cooling water bath, a cooling jacket or the like may be used. When the mixture has reached a temperature of about 70° to 80° F., the remaining components are slowly added, with thorough mixing between the addition of each component. A suggested but not critical order of addition of the remaining ingredients would be the drying oil, the individual metal driers, and the polyisobutylene.

In another suggested method of preparing the composition, the calcium overbased sulfonate may be added to the room temperature diluent oil. These components may be mixed together until uniform, and then heated to about 140° F. When the mixture reaches 140° F., the pre-heated oxidized petrolatum may be added, and these components mixed together until uniform. The mixture may then be allowed to cool and the remaining ingredients added, as described previously.

After all of the components have been added, it is recommended that composition be mixed for an additional period of time to insure thorough mixing. For example, the composition could be mixed for an additional 15 minutes.

During the addition of components and mixing which follows the cooling to about 70° to 80° F., care should be taken to avoid the whipping of air into the mixture. At the suggested temperature, the viscosity of the mixture is such that entrapped air bubbles are unlikely to rise to the surface and escape.

Where pigments, suspension aids or other non-volatile components are also utilized, they may be added at any point, but preferably while the mixture is hot, for each of addition. However, the methyl ethyl ketoxime composition should be added immediately before packaging so that it will volatilize into the head space.

The composition can be stored in appropriate sealed containers, under ambient conditions.

Method of Preventing Corrosion

The method according to the present invention comprises forming a coating of from about 2-15 mils thick on the surface to be protected, the coating being of the composition previously described, and allowing the coating to cure. Frequently the coating thickness will be between either 4 and 7 mils or 7 and 10 mils.

The coating can be formed by any suitable application method such as brushing, rolling, immersion of the surface to be coated, spraying, flotation coating, or the like. Generally, where necessary, the composition of this invention will flow sufficiently to provide a smooth and uniform coating even when applied by brush, spatula, or the like.

For immersion coating, the surface to be coated is simply dipped into the composition and then removed. The thickness of the coating applied in this way will of course vary depending upon the viscosity of the coating composition. However, we have found that a coating of about eight mils will often form on an immersion coated metal surface with a temperature of about 75° F., while a coating of about 5 to 6 mils will often form on a metal surface with a temperature of about 120° F.

For reasons of cost effectiveness, spraying is the preferred method of application. Generally, spray coating can be accomplished using less of the coating composition. Suitable spraying techniques are well known in the art.

Flotation coating or float coating is a well-known method for coating the inside of tanks such as ballast tanks for ships, barges, offshore oil rigs, etc. The flotation coating technique involves filling the tank with water, pouring the corrosion-inhibiting composition onto the surface of the water, and draining the water from the tank. The layer of corrosion-inhibiting composition is deposited on the sidewalls and bottom of the tank as the water drains out. However, where possible, for economical reasons spraying is the preferred method of application for tank interiors.

Several factors affect the curing of the coating composition of this invention. These factors include the presence of oxygen or air (greater air circulation generally contributes to faster curing); the presence of moisture in the air (less moisture generally contributes to faster curing); the temperature (higher temperatures generally contribute to faster curing); and the coating thickness (a thinner coating generally tends to cure faster). Sometimes these factors affect one another. For example, where the temperature of the surface to be coated is lower, the coating will tend to be thicker. Several factors contribute to the temperature of the surface to be coated, for example, the season of the year and the geographic location of the surface. However, we have found that the coating will typically cure within about 10 days, and under most conditions, about 5 days.

Generally, a ballast tank is virtually a closed tank. Typically, the interior will have very little air circulation,, and a high moisture content. Under such ballast tank conditions, at a temperature of about 60° F. to 100° F. and a coating thickness of about 8-10 mils, a typical coating composition of this invention should generally be allowed to cure for about 3 to 5 days before the tank is filled with water. A curing period of over 5 days would generally be required only where the temperature is under 60° F. or the coating thickness exceeds 10 mils.

It is preferred that any loose rust or other substances which would limit adhesion be physically removed from a surface prior to coating. It is not necessary to remove the tightly bonded rust which will very often be found on a metal surface. However, use of a degreaser such as a solvent emulsifying compound is recommended where there is any oily contamination.

The following specific Examples which include the best mode were prepared and tested as described.

EXAMPLE I

Into a 250 ml. beaker was charged 30 grams naphthenic oil having an approximate molecular weight of 363 and a viscosity at 103° F. of about 100–115 s.s.u. To the naphthenic oil was added 50 grams of calcium overbased sulfonate, trademarked SACI 200A, obtained from Witco Chemical, New York. These two components were thoroughly mixed at room temperature until uniform.

The mixture was then slowly heated to 140° F. using a hot plate.

Five grams of oxidized petrolatum trademarked ALOX 600 obtained from the Alox Corporation, were slowly heated to 140° F. This pre-heated petrolatum was then slowly added with stirring to the 140° F. oil and sulfonate mixture. These components were thoroughly mixed together.

The mixture was then allowed to cool to 80° F. by standing at room temperature on the bench. To the mixture was then slowly added with stirring 10 grams of tung oil. After the addition of tung oil, the stirring continued for about 2 minutes.

Next, 2.5 grams of a 16% zinc carboxylate compound (16% zinc CEM-ALL) were slowly added with stirring which continued for about 2 minutes after the addition. Next, slowly added to the mixture with stirring was 2.5 grams 12% copper carboxylate compound (12% copper CEM-ALL). The mixture was stirred for about 2 minutes following the addition of the copper carboxylate compound.

Next, slowly added with stirring was 2.5 grams 6% rare earth neodecanoate (6% rare earth TEN-CEM). This composition was then thoroughly mixed for about 15 minutes.

The resulting composition was then tested using the static synthetic sea water immersion test. For the test, a metal panel (mild steel ASTM A366, sandblasted) measuring 2"×4"×1/16" was coated with an 11 mil thickness of the composition by dipping the panel into a beaker containing the composition. The coating on the panel was allowed to cure under ambient conditions (75° F., 30% humidity). After 8 days, the coating had cured to a semi-hard film which was dry to the touch.

A 400 milliliter beaker was charged with 175 milliliters of synthetic sea water. The coated and cured panel was immersed at an angle of about 39°, with about 2" of the panel below the surface of the sea water and about 2" above the surface. The beaker was then covered with Parafilm (trademark) film obtained from American Can Co., to prevent evaporation.

The coated panel was observed every 1 to 2 months for signs of corrosion by removing it from the beaker and visually inspecting it. In addition, the panel was scraped with a sharp edge or rubbed with fingers to see whether the coating adhered to the metal and whether it remained hard. After 17 months there was no visible corrosion on the panel and the coating was hard and adhered well to the metal. The test is still continuing.

Another substantially identical coated and cured panel was tested using the salt fog or salt-spray test as set forth in ASTM B117-73. The salt fog or salt spray test is considered to be more severe than the static immersion test or the agitated immersion test described in Example II. Briefly, in the salt fog test, the panel is placed on a salt fog chamber, in a rack, leaning slightly back from a vertical position. The panel is supported at 2 points at its bottom edge and 1 point at its middle back side. The salt fog chamber is operated at about 95° F., 100% humidity, with a 5% NaCl mist or fog.

After over one month of salt fog testing the panel has no visible corrosion. The test is continuing.

EXAMPLE II

The composition was prepared exactly in Example I, except that 45 grams of naphthenic oil were utilized in place of 30 grams; 35 grams of SACI 200A were used in place of 50 grams; 2 grams of 16% zinc CEM-ALL were used instead of 2.5 grams; 2 grams of 12% copper CEM-ALL were used instead of 2.5 grams; and 1 gram of PARATAC (trademark) polyisobutylene was used.

A panel was coated and allowed to cure as in Example I, but with a coating thickness of 5 mils rather than 11 mils. The coating composition cured in 5 days.

The coated panel was tested using the agitated synthetic sea water immersion test. For this test, into a 1,000 milliliter beaker was charged 500 milliliters of synthetic sea water. The coated and cured panel was suspended vertically, with about 2" of it below the surface of the water and about 2" of it above the surface. The beaker was placed on a Fisher Model 11-492-10 agitating hot plate, which was continually operated at 220 orbits per minute at ambient temperature (75° F.). As evaporation occurred, the synthetic sea water solution was replenished with distilled water.

This agitated synthetic sea water immersion test is considered to be more severe than the static synthetic sea water immersion test.

The coated panel was examined as described in Example I. After almost 3 months, very slight rust appeared.

A second substantially identical coated and cured panel was tested as in Example I using the salt fog method. After over 3 months in the chamber, very slight rust appeared.

EXAMPLE III

The composition was prepared exactly as in Example I, except 36 grams of naphthenic oil were used instead of 30 grams; 35 grams of SACI 200A were used instead of 50 grams; 15 grams of tung oil were used instead of 10 grams; 3 grams of 22% zinc HEX-CEM were used instead of 2.5 grams 16% zinc CEM-ALL; 3 grams of 12% copper carboxylate were used instead of 2.5 grams; and 2 grams of PARATAC (trademark) polyisobutylene and 1 gram of SKINO (trademark) methyl ethyl ketoxime were added.

A panel was coated with this composition and cured exactly as in Example I, except the coating thickness was 7 mils and the coating cured in 5 days.

This composition was tested exactly as in Example I using the static synthetic sea water immersion test. After 10 months there was no visible corrosion. The test is continuing.

A second coated and cured panel substantially identical to the first panel was tested as in Example I using the salt fog method. After 9 months there was no visible corrosion, and the test continues.

EXAMPLE IV

The composition was prepared exactly as in Example III, except 38 grams of naphthenic oil were used instead of 36 grams; 2 grams of 22% zinc HEX-CEM were used instead of 3 grams; and no methyl ethyl ketoxime was used.

A panel was coated with this composition and cured exactly as in Example III.

This composition was tested exactly as in Example III using the static synthetic sea water immersion test. After 8 months there was no visible corrosion and the coating appeared hard and was adhering well. The test is continuing.

A second coated and cured panel substantially identical to the first panel was tested as in Example I using the salt fog method. After 3 months there was no visible corrosion and the test is continuing.

EXAMPLE V

The composition was prepared exactly as in Example IV, except 33 grams naphthenic oil was used instead of 38 grams; 40 grams of SACI 200A were used instead of 35 grams.

Six panels were coated with this composition and cured exactly as in Example IV, except the coating thickness was 9 mils and the test on each panel began after a different curing time. The curing times were as follows:

| Panel 1 | 0 hours |
| Panel 2 | 7 hours |
| Panel 3 | 24 hours |
| Panel 4 | 48 hours |
| Panel 5 | 72 hours |
| Panel 6 | 96 hours |

After the given curing time, the panels were subjected to the agitated synthetic sea water immersion test exactly as in Example II. After 48 hours of immersion, it appeared that the coating on panels 1 and 2 had been removed by the action of the water. After 2 weeks, there was no visible corrosion on any of the panels. After 7 months, each panel exhibited slight corrosion at the side edge of the panel where it met the water line. In addition, panel 1 exhibited 3 orange colored spots having a diameter of about 5 millimeters along the water line, and panel 2 exhibited one such spot. The testing of each panel is continuing.

EXAMPLE VI

The composition was prepared exactly as in Example V except 38 grams naphthenic oil were used instead of 33 grams; 36.3 grams SACI 200A were used instead of 40 grams; 14 grams of tung oil were used instead of 15 grams; 4.5 grams of Alox 200 oxidized petrolatum were used instead of 5 grams; 2.7 grams 12% copper CEM-ALL were used instead of 3 grams; 2.7 grams 16% zinc CEM-ALL were used instead of 2 grams of 22% zinc HEX-CEM; no polyisobutylene was used; 0.9 grams SKINO methyl ethyl ketoxime and 0.9 grams L243 aluminum pigment were used.

A panel was coated with this composition and cured exactly as in Example I, except the coating thickness was 13 mils and the coating cured in 5 days.

The composition was tested exactly as in Example I utilizing the salt fog test. After the panel was placed in the salt fog chamber, the coating appeared to soften. After 5 months of exposure to salt fog, there was no visible corrosion on the panel. After about 5 more months, about 50% of the panel appeared to be rusted.

For currently unknown reasons, some embodiments of the composition may soften and sag under extreme conditions. This does not appear to affect the performance of the composition in inhibiting corrosion.

The foregoing Examples and discussion provides the detailed discussion of the invention. However, since many embodiments of the invention can be made without departing from the spirit and scope of the invention, the invention resides in the claims hereinafter appended.

I claim:

1. An improved method of preventing corrosion on a surface, which comprises:
   (a) forming a coating of from about 2 to 15 mils thick on the surface, with a composition comprising:
      (i) about 10 to 80% by weight of a rust-inhibitive, grease-like concentrate comprising a thixotropic inorganic/organic complex stably dispersed in an essentially inert liquid oily phase in an amount not to exceed 4 parts, per part of said complex, of said essentially inert liquid oily phase, said inorganic/organic complex comprising an over-based alkaline earth organic sulfonate salt, whereby the crystalline structure of the inorganic portion of said complex is platelet and film-forming in character;
      (ii) about 5 to 25% by weight of at least one drying oil, said drying oil being miscible in a diluent oil selected from the group consisting of aliphatic hydrocarbon diluents, cycloaliphatic hydrocarbon diluents, aromatic hydrocarbon diluents, and mixtures thereof, boiling at temperatures above 150° C.;
      (iii) about 0.03–0.6% by weight metal, provided by a first metal drier selected from the group consisting of copper carboxylate compounds, rare earth carboxylate compounds and mixtures thereof;
      (iv) about 0.1 to 2.2% by weight metal, provided by a second metal drier consisting of zinc carboxylate compounds;
      (v) about 20 to 60% by weight naphthenic or straight chain paraffinic oils or mixtures thereof;
      (vi) about 2 to 15% by weight petrolatum; and
   (b) curing the coating.

2. The method of claim 1 wherein the first metal drier comprises a copper carboxylate compound, and the composition further comprises a third metal drier comprising a rare earth carboxylate compound providing a rare earth metal concentration of about 0.06 to 0.3% by weight of the composition.

3. The method of claim 2 wherein the third metal drier comprises a lanthanum or cerium carboxylate compound.

4. The method of claim 1 wherein the composition further comprises up to about 5% by weight polyisobutylene.

5. The method of claim 1 wherein the coating is from about 4 to no greater than 7 mils thick.

6. The method of claim 1 wherein the coating is from greater than 7 to about 10 mils thick.

7. The method of claim 1 wherein the first metal drier consists essentially of neutralized copper organic acid compounds in an amount to provide copper of from about 0.06 to 0.6% by weight of the total composition.

8. The method of claim 7 wherein the second metal drier consists essentially of neutralized zinc organic acid compounds.

9. The method of claim 8 wherein the drying oil comprises tung oil.

10. The method of claim 9 wherein the over-based alkaline earth organic sulfonate salt comprises an over-based calcium sulfonate compound.

11. The method of claim 1 wherein the coating is formed by flotation coating.

12. The method of claim 1 wherein the coating is formed by spraying.

13. The method of claim 1 wherein the coating is cured by allowing it to remain under ambient conditions for up to about 10 days.

14. A method of prohibiting corrosion on a surface exposed to seawater, which comprises forming a coating up to about 15 mils thick on the surface with a composition consisting essentially of about 30 to 40% overbased calcium sulfonate, about 10 to 20% tung oil, about 30 to 45% naphthenic or straight chain paraffinic oils or mixtures thereof, about 3 to 8% petrolatum, about 0.1 to 0.6% copper provided by copper carboxylate compounds, about 0.2 to 1.1% zinc provided by zinc carboxylate compounds, about 0.06 to 0.3% rare earth metals provided by rare earth carboxylate compounds, and allowing the coating to cure.

15. The method of claim 14 wherein the coating has a thickness of 4 mils or greater.

16. The method of claim 14 wherein the coating has a thickness of about 7–10 mils.

17. The method of claim 14 wherein the surface is an interior surface of a ballast tank and the coating is formed by flotation coating.

18. The method of claim 14 wherein the surface is an interior surface of a ballast tank and the coating is formed by spraying.

19. The method of claim 14 wherein the coating is allowed to cure for up to about 5 days.

20. A method of prohibiting corrosion on a surface exposed to seawater, which comprises forming a coating up to about 15 mils thick on the surface with a composition consisting essentially of about 30 to 40% overbased calcium sulfonate, about 10 to 20% tung oil, about 30 to 45% naphthenic or straight chain paraffinic oils or mixtures thereof, about 3 to 8% petrolatum, about 0.1 to 0.6% copper provided by copper carboxylate compounds, about 0.2 to 1.1% zinc provided by zinc carboxylate compounds, about 0.06 to 0.3% rare earth metals provided by rare earth carboxylate compounds, up to about 5% polyisobutylene, and allowing the coating to cure.

21. A corrosion-inhibiting composition which comprises:
   (a) about 10 to 80% by weight of a rust-inhibitive, grease-like concentrate comprising a thixotropic inorganic/organic complex stably dispersed in an essentially inert liquid oily phase in an amount not to exceed 4 parts, per part of said complex, of said essentially inert liquid oily phase, said inorganic/organic complex comprising an over-based alkaline earth organic sulfonate salt, whereby the crystalline structure of the inorganic portion of said complex is platelet and filmforming in character;
   (b) about 5 to 25% by weight of at least one drying oil, said drying oil being miscible in a diluent oil selected from the group consisting of aliphatic hydrocarbon diluents, cycloaliphatic hydrocarbon diluents, aromatic hydrocarbon diluents, and mixtures thereof, boiling at temperatures above 150° C.;
   (c) about 0.03 to 0.6% by weight metal provided by a first metal drier selected from the group consisting of copper carboxylate compounds, rare earth carboxylate compounds, and mixtures thereof;
   (d) about 0.1 to 2.2% by weight metal provided by a second metal drier selected from the group consisting of zinc carboxylate compounds;
   (e) about 20 to 60% naphthenic or straight chain paraffinic oils; and
   (f) about 2 to 15% petrolatum.

22. The composition of claim 21 which further comprises up to 5% by weight polyisobutylene.

23. The composition of claim 21 wherein the first metal drier comprises a copper carboxylate compound, and the composition further comprises a third metal drier comprising a rare earth carboxylate compound providing a rare earth metal concentration of about 0.06 to 0.3% by weight of the composition.

24. The composition of claim 23 wherein the third metal drier comprises a lanthanum or cerium carboxylate compound.

25. The corrosion-inhibiting composition of claim 21 wherein the first metal drier consists essentially of neutralized copper organic acid compounds.

26. The corrosion-inhibiting composition of claim 25 wherein the second metal drier consists essentially of neutralized zinc organic acid compounds.

27. The corrosion-inhibiting composition of claim 26 wherein the drying oil comprises tung oil.

28. The corrosion-inhibiting composition of claim 27 wherein the over-based alkaline earth organic sulfonate salt comprises an over-based calcium sulfonate compound.

29. A corrosion-inhibiting composition which consists essentially of about 30 to 40% over-based calcium sulfonate, about 10 to 20% tung oil, about 30 to 45% naphthenic oil, about 3 to 8% petrolatum, about 0.1 to 0.6% copper provided by copper carboxylate compounds, about 0.2 to 1.1% zinc provided by zinc carboxylate compounds, and about 0.06 to 0.3% rare earth metals provided by rare earth carboxylate compounds.

30. A corrosion-inhibiting composition which consists essentially of about 30 to 40% over-based calcium sulfonate, about 10 to 20% tung oil, about 30 to 45% naphthenic oil, about 3 to 8% petrolatum, about 0.1 to 0.6% copper provided by copper carboxylate compounds, about 0.2 to 1.1% zinc provided by zinc carboxylate compounds, about 0.06 to 0.3% rare earth metals provided by rare earth carboxylate compounds, and up to about 5% polyisobutylene.

* * * * *

UNITED STATES PATENT AND TRADEMARK OFFICE
CERTIFICATE OF CORRECTION

PATENT NO. : 4,495,225
DATED : January 22, 1985
INVENTOR(S) : STANLEY J. CIUBA et al It is certified that error appears in the above-identified patent and that said Letters Patent are hereby corrected as shown below:

Column 2, line 31, for "disposed" read --dispersed--.
Column 6, line 3, for "coating coating composition" read --coating composition--.

Signed and Sealed this

Seventh Day of May 1985

[SEAL]

Attest:

DONALD J. QUIGG

Attesting Officer — Acting Commissioner of Patents and Trademarks